(12) United States Patent
Chalabi et al.

(10) Patent No.: US 9,284,504 B2
(45) Date of Patent: Mar. 15, 2016

(54) WASTE PROCESSING (71) Applicant: Chinook End-Stage Recycling Limited, Nottingham (GB)

(72) Inventors: Rifat Al Chalabi, Nottingham (GB); Ophneil Henry Perry, Nottingham (GB)

(73) Assignee: Chinook End-Stage Recycling Limited, Nottingham (GB)

( * ) Notice: Subject to any disclaimer, the term of this patent is extended or adjusted under 35 U.S.C. 154(b) by 0 days.

(21) Appl. No.: 14/400,905

(22) PCT Filed: May 8, 2013

(86) PCT No.: PCT/GB2013/051190
§ 371 (c)(1),
(2) Date: Nov. 13, 2014

(87) PCT Pub. No.: WO2013/171457
PCT Pub. Date: Nov. 21, 2013

(65) Prior Publication Data
US 2015/0137042 A1 May 21, 2015

(30) Foreign Application Priority Data

May 15, 2012 (GB) .................................. 1208656.7

(51) Int. Cl.
*C01B 3/38* (2006.01)
*C10J 3/72* (2006.01)
(Continued)

(52) U.S. Cl.
CPC ................ *C10J 3/723* (2013.01); *C10B 49/02* (2013.01); *C10B 53/00* (2013.01); *C10J 3/02* (2013.01); *C10J 3/20* (2013.01); *C10J 3/62* (2013.01); *C10J 3/721* (2013.01); *C10J 3/86* (2013.01); *C10K 1/08* (2013.01); *C10K 3/008* (2013.01); *C10J 2200/09* (2013.01); *C10J 2300/0916* (2013.01); *C10J 2300/0946* (2013.01); *C10J 2300/0959* (2013.01); *C10J 2300/1253* (2013.01); *C10J 2300/165* (2013.01);
(Continued)

(58) Field of Classification Search
CPC ................................................ C01B 2203/0255
USPC .................................... 252/373; 423/650–655
See application file for complete search history.

(56) References Cited

U.S. PATENT DOCUMENTS 7,331,119 B2  2/2008  Perry et al.
8,096,063 B2  1/2012  Perry et al.
(Continued)

FOREIGN PATENT DOCUMENTS

DE  10 2008 014799  9/2009
GB  2475889  6/2011
(Continued)

*Primary Examiner* — Melvin C Mayes
*Assistant Examiner* — Kenneth Vaden
(74) *Attorney, Agent, or Firm* — Wells St. John P.S.

(57) ABSTRACT

This invention provides a system and method for pyrolyzing and/or gasifying material such as organically coated waste and organic materials including biomass, industrial waste, municipal solid waste and sludge. In a first mode of operation the method/system heats the material in a processing chamber (10) by passing hot gas therethrough. This pyrolyzes and/or gasifies the organic content it to produce syngas and, invariably, soot. In a second mode of operation the method/system increases the oxygen content of the hot gas such that the oxygen within the hot gas reacts with the heated soot to form carbon monoxide.

30 Claims, 6 Drawing Sheets

(51) Int. Cl.

| | | |
|---|---|---|
| *C10J 3/02* | (2006.01) | |
| *C10J 3/62* | (2006.01) | |
| *C10J 3/86* | (2006.01) | |
| *C10K 1/08* | (2006.01) | |
| *C10B 49/02* | (2006.01) | |
| *C10B 53/00* | (2006.01) | |
| *C10K 3/00* | (2006.01) | |
| *C10J 3/20* | (2006.01) | |
| *F02M 21/02* | (2006.01) | |

(52) U.S. Cl.
CPC .. *C10J2300/1606* (2013.01); *C10J 2300/1823* (2013.01); *C10J 2300/1884* (2013.01); *C10J 2300/1892* (2013.01); *F02M 21/0215* (2013.01)

(56) References Cited

U.S. PATENT DOCUMENTS

| 8,231,382 | B2 | 7/2012 | Perry et al. |
| 8,790,428 | B2 | 7/2014 | Tetzlaff |
| 2003/0145482 | A1 | 8/2003 | Perry et al. |
| 2008/0120867 | A1 | 5/2008 | Perry et al. |
| 2008/0244976 | A1 | 10/2008 | Paisley |
| 2009/0038177 | A1 | 2/2009 | Perry et al. |
| 2010/0139534 | A1 | 6/2010 | Tsantrizos |
| 2011/1008336 | | 4/2011 | Tetzlaff |
| 2011/0146155 | A1 | 6/2011 | Bentzen |
| 2012/0298020 | A1 | 11/2012 | Chalabi et al. |

FOREIGN PATENT DOCUMENTS

| GB | 1208656.7 | 6/2012 |
| JP | 03-294788 | 12/1991 |
| JP | 07-126648 | 5/1995 |
| JP | 2003-292963 | 10/2003 |
| JP | 2006-124559 | 5/2006 |
| JP | 2007-119577 | 5/2007 |
| JP | 2008-201925 | 9/2008 |
| WO | WO 2005/113732 | 12/2005 |
| WO | WO 2006/100512 | 9/2006 |
| WO | WO 2007/048058 | 4/2007 |
| WO | WO 2008/044216 | 4/2008 |
| WO | WO 2008/107727 | 9/2008 |
| WO | WO 2010/022741 | 3/2010 |
| WO | PCT/GB2013/051190 | 6/2013 |
| WO | PCT/GB2013/051190 | 8/2014 |

WASTE PROCESSING

CROSS REFERENCE TO RELATED APPLICATION

This application is a 35 U.S.C. §371 of and claims priority to PCT International Application No. PCT/GB2013/051190 which was filed on 8 May 2013, and was published in English, and claims priority to GB Patent Application No. 1208656.7, which was filed on 15 May 2012, the teachings of which are incorporated herein by reference.

The present invention relates to a method and system for processing material by pyrolysis and/or gasification, in particular the method and system relate to controlling the build up of soot created as a result of the pyrolysis/gasification process.

The pyrolysis/gasification of material to create syngas is a well-known and documented process. Known processes for pyrolysing/gasifying material include both batch processes and continuous processes. In both methods the process essentially consists of heating up the material that is to be processed in a substantially oxygen-free environment for pyrolysis and in a low oxygen environment for gasification to thermally break down the organic content of the material to form synthesis gas commonly referred to as syngas.

An unavoidable by product of the process is the production of soot. The soot builds up during the process and creates a lining on the interior of the surfaces of the processing chamber and the conduits of the system through which the process gas is passed. Over time this build up of soot can have a number of detrimental effects on the operation of the system. Firstly, the soot build up can cover any sensors of the system degrading their performance over time. Secondly the build up of soot can create a significant hazard within the system. If, for example immediately following the end of the processing cycle, part of the system is opened while the soot lining the system is still at a high temperature, for example in the region of 400-500° C. then the influx of oxygen from the air when the system is opened can cause the flash combustion of the soot having a possible devastating effect on any operatives in the region when the system is opened. Although more soot is created in the pyrolysis process the problems above occur in both pyrolysis and gasification processes. As will be appreciated the danger of soot igniting on opening the system is particularly problematic on patch operating systems where the system needs to be opened regularly to change the batch of material, and to wait until the temperature falls to below the combustion temperature of the soot odor to opening the system would unduly extend the processing time of each batch, thereby significantly decreasing the efficiency of Inc process.

It is the purpose of the present invention to mitigate some of the above mentioned problems.

According to a first aspect of the invention there is provided a batch method of processing material having organic content, such as organically coated waste and organic materials including biomass, industrial waste, municipal solid waste and sludge, the method comprising: in a first mode of operation heating the material in a processing chamber by recirculating hot gas therethrough, to pyrolyse and/or gasify it to produce syngas, soot, and residual material; and in a second mode of operation increasing the oxygen content of the recirculating gas within the process such that the oxygen reacts with the heated soot to form carbon monoxide.

The second mode of operation is carried out in the same processing chamber as the first mode of operation.

The residual material may comprise entirely inert non organic matter. i.e. metal, glass etc, or may optionally include char or carbonic residues from the pyrolysis/gasification process. The residual material can be maintained in the processing chamber in the second mode of operation As used herein the term soot is used to mean impure carbon particles and derivatives including cokes and chars.

In a preferred method of operation the second mode of operation follows the first mode of operation after the majority of the material in the processing chamber has been pyrolysed and/or gasified The method may further comprise: in the second mode of operation monitoring one or more of the calorific value of the gas, the hydrogen content of the gas, and the carbon monoxide content of the gas. If one or more of the calorific value, the hydrogen content, and the carbon monoxide content of the gas is very low or substantially zero ending the process. No increase in the one or more of the calorific value of the gas, the hydrogen content of the gas, or the carbon monoxide content of the gas indicates that the oxygen is no reacting with any soot and therefore the system is free of soot so may be safely opened to change the batch of material, even if the internal temperature of parts of the system is still above the combustion temperature of soot. The hydrogen content can be indicative of the combustion of soot as, if steam is present in the recirculating gas it may react with the soot and/or carbon monoxide to release hydrogen. The method may include introducing steam into the recirculating hot gas in the second mode of operation The method may comprise, in the second mode of operation, monitoring the temperature of the gas and if the temperature of the gas remains substantially constant, ending the process. This is also indicative of the presence of soot as upon combustion the soot will release heat so will release heat if present. If there is no temperature increase detected when the oxygen content is increased in the second mode of operation then this can be used as an indicator that the system is free form soot.

If, in the second mode of operation, a rise is detected in the one or more of the calorific value of the gas, the hydrogen content of the gas, and the carbon monoxide content of the gas, the method further comprises a third mode of operation in which further oxygen is introduced into recirculating gas, and wherein in the third mode of operation the calorific value of the one or more of the calorific value of the gas, the hydrogen content of the gas, and the carbon monoxide content of the gas, continues to be monitored, in the third mode of operation the temperature of the recirculating gas may also be monitored. When it is detected that soot is present it may be necessary to continue to introduce oxygen to the system as, as it reacts with the soot, the oxygen will become depleted over time. The necessity of this will depend on the amount of oxygen added in the second stage of operation. Steam may also be introduced into the recirculating hot gas in the third mode of operation.

In one embodiment the process is a pyrolysis process and the material is processed in the first mode of operation in a substantially oxygen free environment. In this embodiment, in the second mode of operation the oxygen could be raised to a value in the range of 1% to 21% by volume, ideally the oxygen content is in the range of 6 to 12% by volume.

In another embodiment the process is a gasification process and the material is processed in the first mode of operation in a reduced oxygen environment in the range of 3% to 12% oxygen by volume. In this embodiment, in the second mode of operation the oxygen could be raised to a value in the range of 6% to 21% by volume. It will be appreciated that within these ranges the oxygen content during the second mode of operation will be above the oxygen content in the first mode of operation.

By switching from the first mode of operation, which is a standard pyrolysis/gasification operation, to the second mode of operation in which the oxygen level within the system is increased, any soot that forms and becomes deposited on the internal surfaces of the system during the first mode of operation reacts with the oxygen during the second mode of operation to form carbon monoxide gas, which then forms part of the gas within or exiting from the system. In this manner any soot deposits on the internal surfaces of the system are periodically removed thereby preventing soot building up to a level at which the system is effected or becomes hazardous.

The method of operation may further comprise: passing the syngas through a thermal treatment chamber in which it is heated for a dwell time to destroy any VOCs therein and wherein; heating the material comprises burning fuel and oxygen at a stoichiometric ratio in a burner in the treatment chamber and circulating the hot gasses through the processing chamber; and wherein increasing the oxygen concentrate comprises adding additional oxygen containing gas to the circulating gas to increase the oxygen concentration thereof.

In a pyrolysis process the burning of fuel and oxygen at a stoichiometric ratio in the burner produces the hot gasses containing substantially no oxygen that are need to heat the material being processed in order for it to pyrolyse. Increasing the oxygen concentration may consist of adding additional oxygen-containing gas into the burner or may alternatively comprise adding additional oxygen-containing gas as a different point within the system. Alternatively the heat may be provided from a separate external heat source and may also comprise a flow of hot gas having a substantially zero, or in the case of gasification a reduced, oxygen content, but which does not re-circulate.

The method may include passing the gas through a bailer downstream of the treatment chamber and: in the first mode of operation operating the boiler at a first level to extract heat therefrom; and in the second and/or third mode of operation operating the boiler at a second level to extract heat therefrom, the second level being lower than the first level to thereby remove less heat. Preferably in the second and/or third mode of operation the boiler is operated such that the gas exiting therefrom is in excess of 350° C., more preferably 400° C. or above. By this method the boiler extracts waste heat from the gas passing therethrough in the first mode of operation so as to cool the outgoing gas. As the carbon build up will not be limited to the area of the system upstream of the boiler it is advantageous to also be able to treat any soot within the system downstream of the boiler. As the reaction of soot with oxygen to produce carbon monoxide requires an elevated temperature then by reducing the amount of power that the boiler takes from the hot gasses passing therethrough the exhaust temperature of the gasses leaving the boiler is increased to a level at which it can react with the soot downstream of the boiler.

In the first mode of operation the method may further comprise passing the gas exiting the boiler through a first scrubber and in the second and/or third mode of operation the method may preferably comprise passing the gas exiting the boiler through a second scrubber. The gas passing the through the second scrubber may be flared to atmosphere.

Downstream of the first scrubber the syngas exiting the system can be used, for example it may be combusted in a syngas engine to produce electricity. As the gasses exiting the system during the second and/or third mode of operation do not have a determinable quality, i.e. the gas composition is not constant or predictable, for example it will include a variable amount of oxygen and the carbon monoxide and hydrogen levels therein will be significantly different from the syngas produced during the first mode of operation, the quality of this gas during the second and/or third mode of operation is not sufficiently reliable for use in, for example, a syngas engine and it is therefore flared off to the atmosphere.

The method may further comprise sensing the hydrogen level in the gas and switching between the first mode of operation and the second mode of operation in response to the sensed hydrogen level. During the first mode of operation as the material being processed reaches a stage where the pyrolysis/gasification is substantially complete the amount of hydrogen gas being produced will start to drop quite quickly. The hydrogen sensor can detect the fluctuations in level of the hydrogen within the re circulating gas and, if this drops a certain amount it can be seen that the process is approaching completion and this can be taken as a signal to switch from the first mode of operation to the second mode of operation.

During the third mode of operation, one or more of the velocity of the recirculating gas, the temperature of the recirculating gas and the oxygen content of the recirculating gas is fluctuated. This has been shown to increase the effectiveness of the soot removal. According to a second aspect of the invention there is provided a system for pyrolysing material such as organically coated waste and organic materials including biomass, industrial waste, municipal solid waste and sludge, according to the method of the first aspect of the invention, the system comprising: a processing chamber in which the material is heated; means for recirculating a supply of hot gas for passing through the processing chamber to heat the material therein to pyrolyse and/or gasify it to produce syngas, soot and residual material; a thermal treatment chamber in which the pyrolysis gasses are heated for a dwell time to destroy any volatile organic compounds (VOC's) therein; and control means configured to operate the system in a first mode of operation to provide a supply of hot gas containing reduced or substantially no oxygen to the processing chamber so that the hot gas pyrolyses and/or gasifies the material therein to produce syngas, soot and residual material, and to operate the system in a second mode of operation wherein the oxygen content of the gas is increased.

The second mode of operation is carried out in the same processing chamber as the first mode of operation.

The residual material may comprise entirely inert non organic matter, i.e. metal, glass etc, or may optionally include char or carbonic residues from the pyrolysis/gasification process. The residual material can be maintained in the processing chamber in the second mode of operation The controller may be configured to switch from the first mode of operation to the second mode of operation without removing any of said residual material.

The system may further comprise means for sensing one or more of the calorific value of the gas, the hydrogen content of the gas, and the carbon monoxide content of the gas, and creating signals indicative thereof; and wherein the wherein the control means is further configured to monitor the signals created by the sensing means and is further configured to end the process if one or more of the calorific value, the hydrogen content, and the carbon monoxide content of the gas is very low or substantially.

A temperature sensor may be provided and be configured to sense the temperature of gas recirculating within the system and create a signal indicative thereof The control means can then be further configured to monitor the signal indicative of the gas temperature and if the temperature of the gas remains substantially constant, end the process.

Means for introducing steam into the system may be provided, and the control means may be configured to operate the means for introducing steam to introduce steam into the system in the second mode of operation.

The control means may be configured to monitor signals indicative of the one or more of the calorific value of the gas, the hydrogen content of the gas, and the carbon monoxide content of the gas, and if a rise is detected in said one or more of the calorific value of the gas, the control means can be configured to operate the system in a third mode of operation in which further oxygen is introduced into recirculating gas, and in the third mode of operation continue to be monitored said signals.

The system may comprise a conduit leading from the thermal treatment chamber to a boiler; and control means further configured to control the amount of heat extracted from the boiler in the second mode of operation to maintain the temperature of the gas downstream of the boiler in excess of 350° C., preferably 400° C. or above.

One or more scrubbers may be provided downstream of the boiler. Where two scrubbers are used diverter valve means are provided to direct the gas to a first one of said scrubbers in a first mode of operation and to direct the gas to the second one of said scrubbers in the second mode of operation. Preferably the system further comprises a flare stack and a syngas engine downstream of the scrubbers. Where a single scrubber is provided a diverter valve is provided downstream of the scrubber for sending the gas to either the syngas engine or to the flare stack. Where two scrubbers are provided the outlet of one scrubber may be connected to the syngas engine and the other scrubber may be connected to the flare stack.

A preferred system of the invention includes a carbon monoxide sensor and the control is configured to switch from the second mode of operation to the first mode of operation in response to the carbon monoxide dropping below a predetermined level.

The system may further comprise a hydrogen sensor, and the controller may be configured to switch from one mode of operation to another mode of operation in response to the sensed hydrogen level.

An embodiment of the invention will now be described, by way of example, with reference to the accompanying drawings in which.

Figure 1:
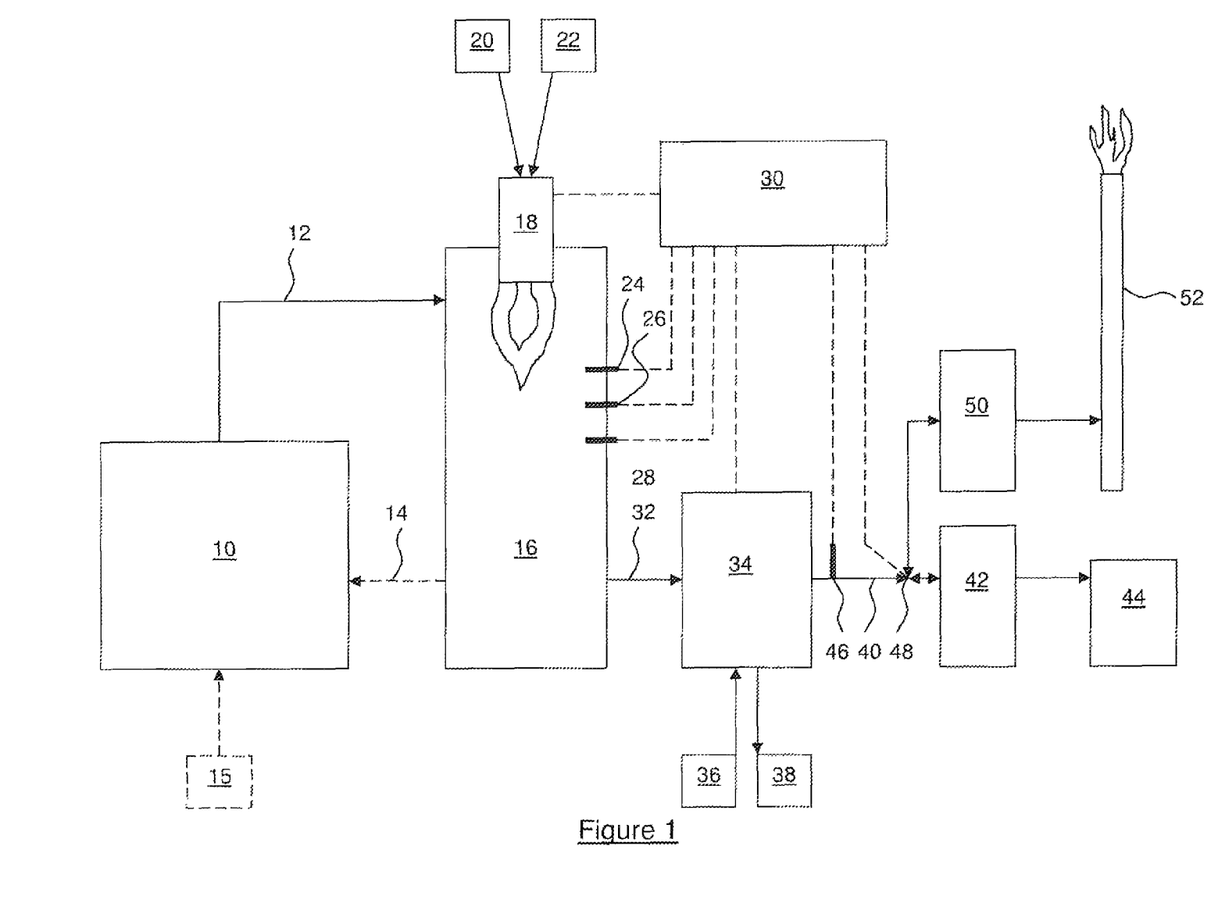
FIG. 1 shows a schematic diagram of a system in accordance with the invention.

Referring to FIG. 1 the system comprises a processing chamber 10 in which material is heated to pyrolyse or gasify it. The processing chamber 10 could be any known processing chamber for example it could be a batch processing chamber or a continuous flow processing chamber. It could, for example, be the oven as described in International patent application WO2006/100512 in the name of Perry et al.

Conduits 12 connect the processing chamber to a thermal treatment chamber 16. Located within the top of the thermal treatment chamber 16 is a burner 18 which is provided with a source of fuel 20, for example natural gas, and a source of oxygen 22, for example air. Fuel and oxygen are combusted in the burner so as to heat the thermal treatment chamber 16 to raise the temperature of the syngas therein so as to break down any VOC's or long chain hydrocarbons therein.

In the first mode of operation the fuel and oxygen can be combusted in the burner at a stoichiometric ratio so as to heat the thermal treatment chamber 16 without combusting any syngas that may be produced by the pyrolysis/gasification process.

Optionally the hot gasses from the thermal treatment chamber 16 may be circulated through the processing chamber 10 via conduits 12 and 14 so as to heat the material therein in a substantially oxygen free, or reduced environment. When the gas is circulated, in a gasification process, the fuel and oxygen may be combusted in the burner at a non-stoichiometric ratio, with a slight excess of oxygen so as to heat the thermal treatment chamber 16 and produce an atmosphere with a reduced (compared to atmosphere) oxygen content, preferably in the range of 3 to 12% by volume.

As an alternative, in the gasification process the thermal treatment chamber may burn fuel and oxygen in a stoichiometric ratio so as to heat the thermal treatment chamber 16 without combusting any syngas that may be produced by the gasification process, and additional oxygen, or oxygen containing gas may be added into the circulating gasses elsewhere within the gas flow.

Alternatively the flow path 14 may be omitted and a separate external heat source 15 may be used to heat the processing chamber 10.

When the material pyrolyses and/or gasifies it produces syngas and soot. Located in the thermal treatment chamber are an oxygen sensor 24, a carbon monoxide sensor 26 and a hydrogen sensor 28 which send signals to a control system 30. Although shown as being located in the thermal treatment chamber 16 it will be appreciated that these sensors may be located anywhere within the recirculating flow path, e.g. they could be located in one of the conduits 12 and 14 or in the processing chamber 10 itself.

Signals produced by the sensors are fed to the control system 30, the ratios of the three gasses being indicative of the quality of the syngas being produced.

Figure 2:
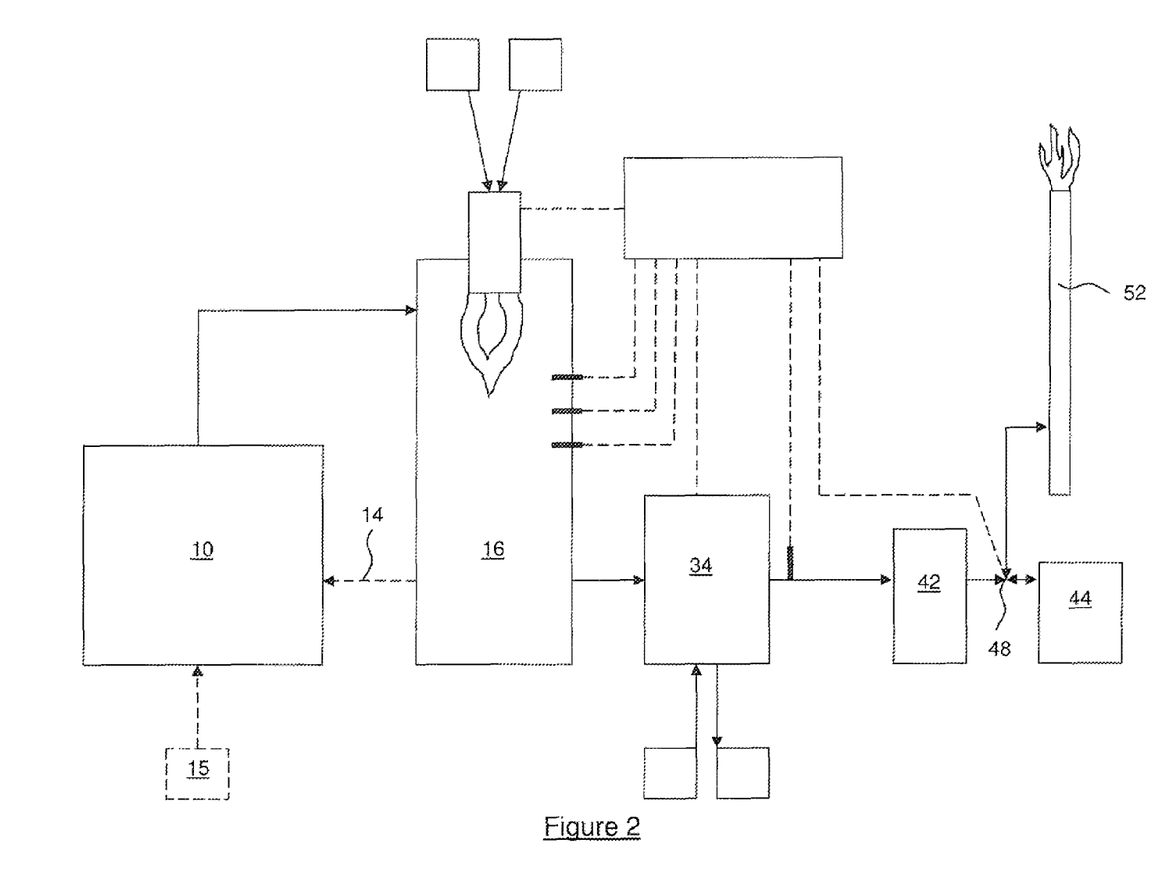
FIG. 2 shows a schematic diagram of an alternative system in accordance with the invention
Figure 3:
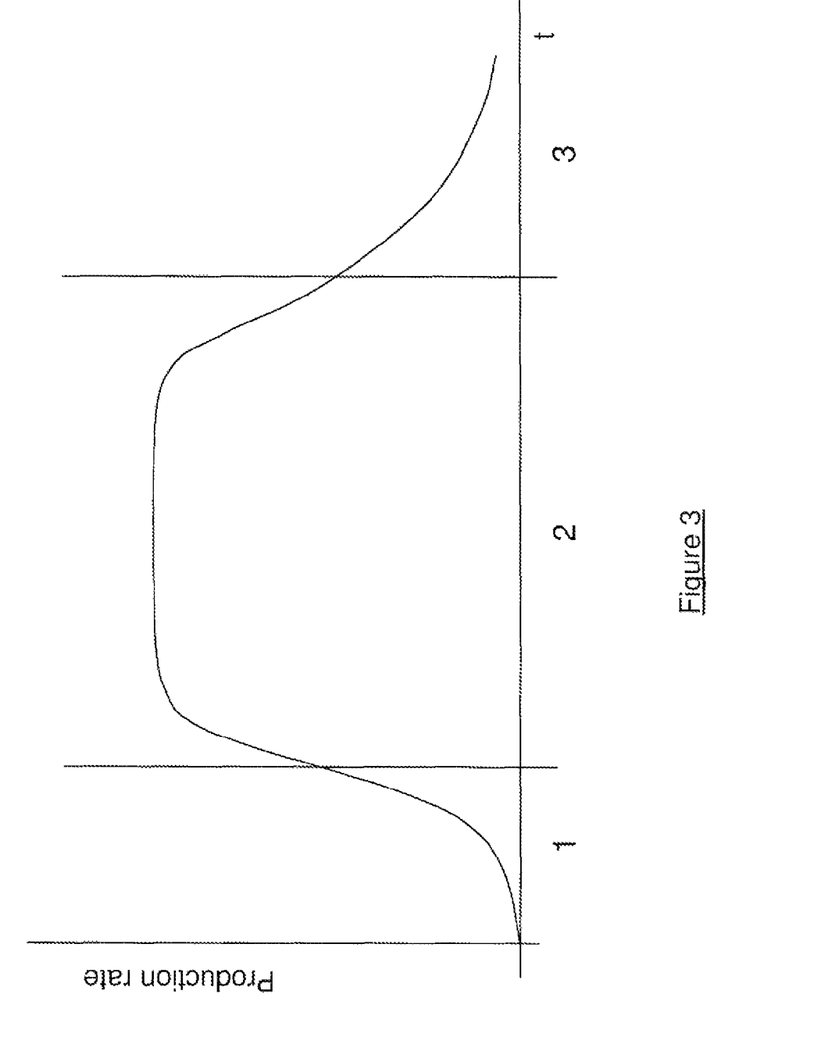
FIG. 3 shows a chart of production rate against time for a batch processing pyrolysis/gasification system.
Figure 4:
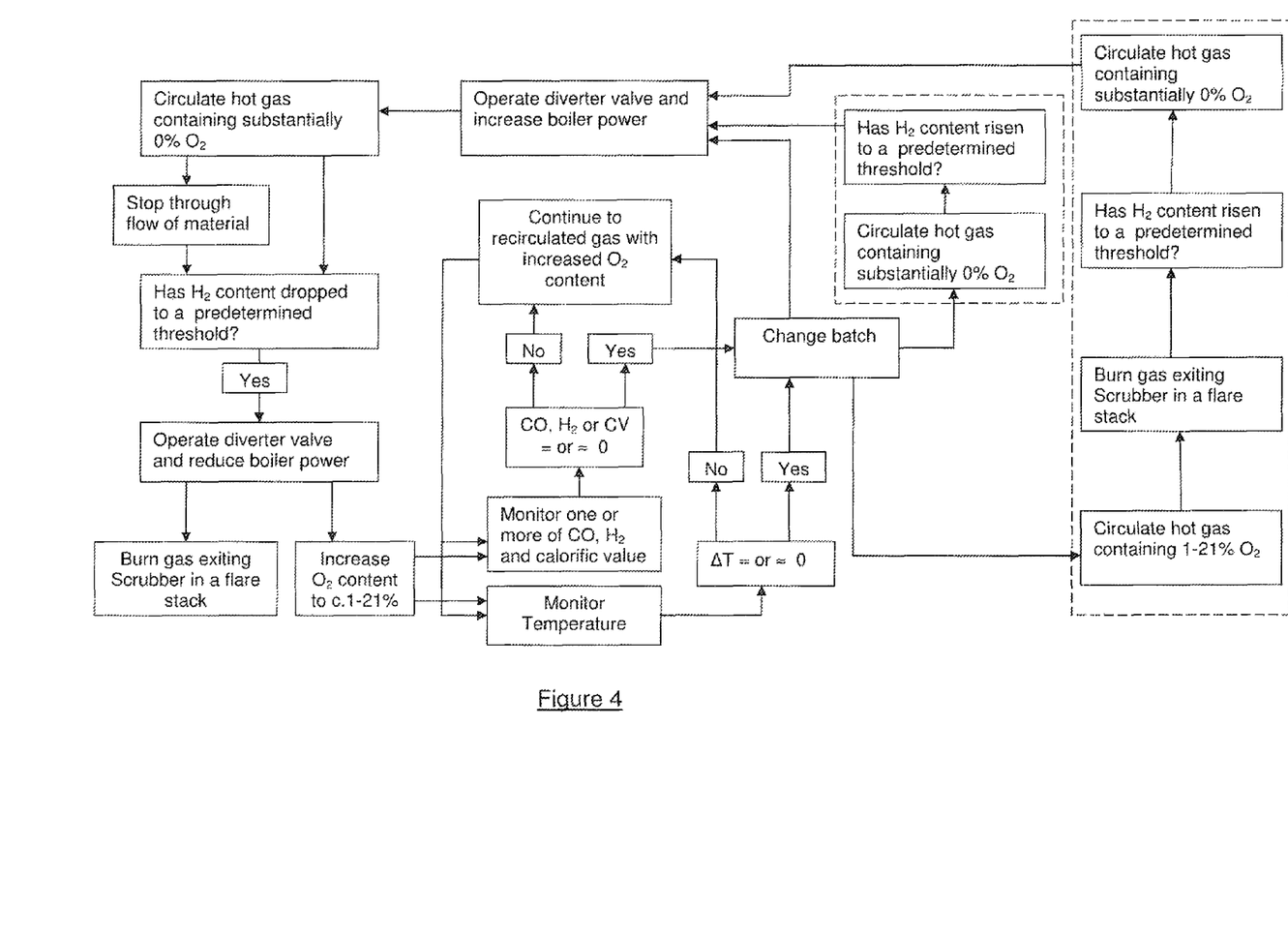
FIG. 4 is a flow diagram of a pyrolysis process according to one embodiment.
Figure 5:
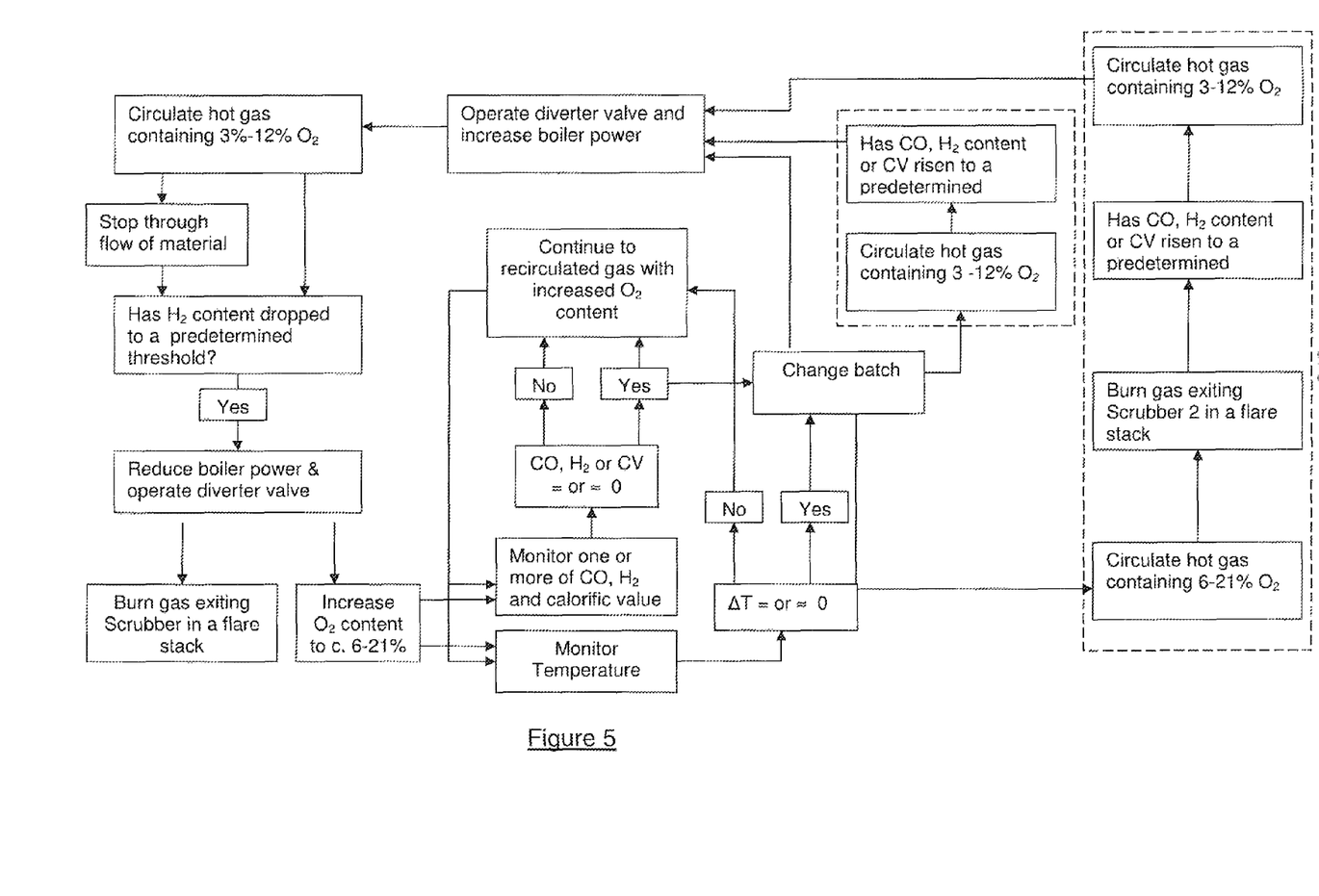
FIG. 5 shows a schematic flow chart of a pyrolysis method of the invention.

FIG. 2 shows a typical production rate curve for hydrogen through a batch processing cycle. In sector 1 the material within the processing chamber 10 is starting to heat up and, as it does, the pyrolysis/gasification reaction commences and the amount of hydrogen being produced starts to increase. In the middle sector 2 of the graph the main reaction is underway and syngas of a fairly constant quality can be produced. It will be appreciated that the shape of the curve in this midsection will be dependent on the type of waste being processed and on the control of the burner 18 to moderate the amount of heat being input to the system. As the process continues and the majority of the material within the processing chamber 10 has been pyrolysed/gasified, the production rate of the hydrogen starts to decrease and the curve enters the final sector 3.

Referring again to FIG. 1 a conduit 32 leads from the thermal treatment chamber 176 to a boiler 34 which acts as a heat exchanger to exchange heat with incoming water 36 to produce steam 38. The amount of heat that is extracted from the gasses flowing through the conduit 32 can be controlled by controlling the flow rate of water entering the boiler 34.

A conduit 40 leads from the boiler 34 to a scrubber 42. The scrubber 42 may be of a suitable known type and is operative to clean the cooled gas exiting the boiler prior to storage or use. For example the syngas may be directly combusted in a syngas engine 44 to produce electricity. The system further comprises a temperature sensor 46 downstream of the boiler 34 and a diverter valve 48 between the boiler and the first scrubber 42. The alternative outlet of the diverter valve 48 leads to a second scrubber 50 which cleans gas flowing therethrough prior to it being flared in a flare stack 53.

In an alternative embodiment shown in FIG. 2 a single scrubber 42 is provided downstream of the boiler 34. A diverter valve 48 is provided downstream of the scrubber 42 which diverts the flow of gas to either a syngas engine 44 or to a flare stack 52. The operation of the valve 48 is as described above in relation to FIG. 1, except in so far as it only diverts between the syngas engine 44 and flare stack 52.

As described above the processing chamber 10 can either be heated by recirculating gas circulated through the treatment chamber 16, conduit 14, and processing chamber 10 or, alternatively, the chamber 10 can be heated by direct heat source 15, which may comprise a burner.

Referring now to FIGS. 1 to 5 the apparatus has a controller 30 which is operable to operate the system in first and second modes of operation, the first mode of operation being the normal production cycle of syngas and the second mode of operation being part of cleaning cycle, in particular the second mode of operation being a test phase of the cleaning cycle to determine if full cleaning is required. In the first mode of operation hot gas is circulated through the processing chamber and the thermal treatment chamber via conduits 12 and 14 and a portion of the circulating gas is withdrawn via conduit 32 and passes through boiler 34 to cool it, scrubber 42 to clean it, and syngas engine 44 to convert it to electricity.

As stated above, the pyrolysis/gasification reaction which happens during the operation produces soot which covers the inner surfaces of the system and, over time, can degrade the function of the system and can present a potential hazard. The cleaning cycle is operative to clean soot from the system and thereby prevent the continuous build up of soot.

In the first mode of operation the hot gas, which contains substantially no oxygen/reduced oxygen circulates through the system to heat the material to pyrolyse/gasify it. To enter the cleaning cycle the controller monitors the hydrogen content of the gas within the system. Once the hydrogen content falls below a pre-determined threshold i.e. it passes from sector 2 to sector 3 of the chart on FIG. 2, then it is determined that the majority of the material within the processing chamber 10 has pyrolysed/gasified and that the syngas now being produced is of an inferior quality. When this is detected the diverter valve 48 receives a signal from the controller 30 and the flow of gasses is directed to the second scrubber 50 after which it is flared to atmosphere in flare stack 52. At the same time the boiler power is reduced, for example by reducing the flow of water thereto, so that less heat is extracted from the gasses passing therethrough. The temperature sensor 46 monitors the temperature of the outgoing gas and feeds a signal to the controller 30 which can then control the power of the boiler 34 to maintain a temperature of over 350°, preferably above a minimum 400°, of the gas exiting the boiler 34.

The ratio of fuel to oxygen being presented to the burner 18 is then altered so that an excess of oxygen is provided. This results in combustion of the fuel 20 consuming less of the oxygen provided and, accordingly, the oxygen content in the thermal treatment chamber, and therefore the conduits 12, 14 and the processing chamber 10, is increased. The gas which is circulating through the processing chamber 10, and also the gas which is passing through the boiler 34 and associated conduits 32 and 40 has an increased oxygen content and the excess oxygen therein and will therefore react with any soot within the system to produce carbon monoxide. As will be appreciated the introduction of additional oxygen into the burner will also result in at least partial combustion of the syngas produced in the processing chamber. However, as the syngas during the cleaning stage is not used, for example in the syngas engine, then by combusting at least part of it in the thermal treatment chamber 16 some additional heat can be recovered in the boiler. Accordingly the control of the boiler may be effected not to reduce the energy extracted from the hot gasses but to extract the required energy to result in the required increased downstream temperature. Due to additional energy released by combustion of syngas in the treatment chamber this could result in the same or even an increased amount of energy extracted from the boiler. However, so far as is practical the fuel input to the burner will be reduced pro rata to the amount of syngas being combusted. As seen from FIG. 2 this takes place at the end of the cycle when the syngas quantity and quality is changing so as the syngas level drops the fuel required will need to be increased to maintain the required temperature for VOC destruction and soot elimination.

Steam may also be injected into the circulating gas in the second mode of operation and will also react with the soot at high temperatures, and/or will react with the by products of the oxidation of the carbon with the increased oxygen.

In the second mode of operation one or more of the calorific value of the gas, the hydrogen content of the gas, and the carbon monoxide content of the gas are monitored and if one or more of them are very low or substantially zero the controller can end the process. These parameters being very low or substantially zero will indicate that there is substantially no carbon reaction taking place (i.e. the system is clean) and can therefore be safely shut down and opened.

In the second mode of operation the temperature of the gas may also be monitored and if the temperature of the gas remains substantially constant, the controller may end the process. The temperature is also indicative of the presence of soot as upon combustion the soot will release heat so will release heat if present. If there is no temperature increase detected when the oxygen content is increased in the second mode of operation then this can be used as an indicator that the system is free form soot. Preferably a combination of a number of factors including two or more of the temperature, hydrogen content, carbon monoxide content, and calorific value of the gas will be used to determine that there is no carbon reacting in the system.

If, in the second mode of operation, a rise is detected in the one, or preferably more, of the temperature, the calorific value of the gas, the hydrogen content of the gas, and the carbon monoxide content of the gas, the system can enter a third mode of operation in which further oxygen is introduced into recirculating gas, and wherein the one or more of temperature; the calorific value of the gas, the hydrogen content of the gas, and the carbon monoxide content of the gas, continues to be monitored. When it is detected that soot is present it may be necessary to continue to introduce oxygen to the system as, as it reacts with the soot, the oxygen will become depleted over time. The necessity of this will depend on the amount of oxygen added in the second stage of operation. Steam may also be introduced into the recirculating hot gas in the third mode of operation. As in the second mode of operation, once the soot is depleted the hydrogen content, carbon monoxide content, and calorific value of the gas will drop to a very low or substantially zero value, and upon detecting this the controller can end the process to allow for batch change. On opening the apparatus, even if it is still hot, this can be done safely as there is no carbon present which could otherwise flash ignite.

It will be appreciated that when using an external heat source 15 which is not the thermal treatment chamber for providing the heat for the pyrolysis/gasification, that the oxygen content can be altered by changing the gas mix in the burner of that external heat source or alternatively, in either case (circulating gas/external heat source) additional oxygen or oxygen containing gas may be introduced into the gas flow through the system at any suitable point in the system.

The oxygen sensor 24 monitors the oxygen within the system and the controller 30 can vary the amount of oxygen being input to the burner to maintain a desired oxygen content. During a pyrolysis process (FIG. 4) the oxygen content will be substantially zero in the first stage of operation and in the region of 1% to 21% by volume, preferably 6% to 21% by volume. During a gasification process (FIG. 5) the oxygen content will be in the range of 3% to 12% by volume during the first mode of operation and in the range of 6% to 21% by volume during the second mode of operation.

In this cleaning mode of operation the soot reacts with the oxygen in the gasses to produce carbon monoxide, the level of which is monitored by carbon monoxide sensor 26 and fed back to the control 30. Once the majority of the soot within the system has reacted with the oxygen then the amount of carbon monoxide within the system will slowly start to fall. Once the carbon monoxide drops beyond a certain predetermined threshold then the controller can determine that the system has been sufficiently cleaned and that the cleaning cycle can end. In the continuous process system the through flow of material through the processing chamber 10 is restarted and the controller sends signals to the boiler 34 to increase its power to recover more heat therefrom and to diverter valve 48 to divert the gasses from the boiler through the first scrubber 42 and onward to the syngas engine 44. Optionally the controller may monitor the $H_2$ content and only divert the gas back to the syngas engine once the $H_2$ content reaches a predefined threshold.

Once the cleaning cycle is complete, the burner can be shut down and the batch of material in the processing chamber 10 can be changed and the burner 18 restarted. The controller can send signals to the boiler 34 and the valve 48 to increase the boiler power and divert system gasses to the first scrubber 42. The gasses from the burner 18 are then circulated through the processing chamber and the next batch of material is processed.

A start-up sequence may be followed which can comprise circulating the hot gas containing reduced (gasification) or substantially zero (pyrolysis) oxygen until the hydrogen content, as detected by hydrogen sensor 28, has reached a certain pre-determined threshold i.e. it has crossed the boundary between section 1 and section 2 of FIG. 2 and, only once the hydrogen content has passed this threshold is valve 48 operated to switch the flow from scrubber 2 to scrubber 1. This ensures that the gas passing through the syngas engine 44 is of a certain quality.

A further additional stage within the method may include also running a cleaning process during the sector 1 of the production graph shown in FIG. 2. In this method after the new batch of material has been placed in the processing chamber 10, hot gasses containing the increased oxygen level are circulated through the processing chamber and then the treatment chamber via conduits 12 and 14 (or are supplied by the external heat source 15) to react with any carbon therein and the gasses therefrom continue to be directed through the second scrubber 50 and flare stack 52. Once the hydrogen content rises to a sudden pre-determined threshold the controller 30 modifies the ratio of oxygen in the gas passing through the processing chamber. This may be done by modifying the ration of oxygen and fuel being burnt in the burner 18 to a stoichiometric ratio and gas containing substantially zero oxygen content for a pyrolysis process or by modifying the ration of oxygen and fuel being burnt in the burner 18 to reduce the oxygen content in a gasification process. The controller sends a signal to valve 48 to direct the gas away from the boiler back to the first scrubber 42 and to increase the power to the boiler 34 and the system is once again in its first mode of operation when it is pyrolysing/gasifying the material within the processing chamber 10 to produce syngas which is used in syngas syndrome 44 to produce electricity.

By running the cleaning circle both at the start and at the end of the process during a batch processing cycle then in the final sector 3 of the batch processing cycle the majority of the soot can be cleared from the system so that it is safe to open the processing chamber to remove and replace the batch of material therein. During the first sector 1 when the new batch commences its cycle the gas which is initially produced is not of sufficient quality to be effectively used in the syngas engine and, accordingly, the cleaning cycle can also, optionally, be run during this phase to continue the cleaning of the soot deposits from within the system.

By running the process and the cleaning cycle as described herein the entire cleaning cycle of the system can be fitted into the normal batch cycle time during the periods when the gas being produced from that particular batch are not effective for conversion to energy in the syngas engine 44.

Figure 6:
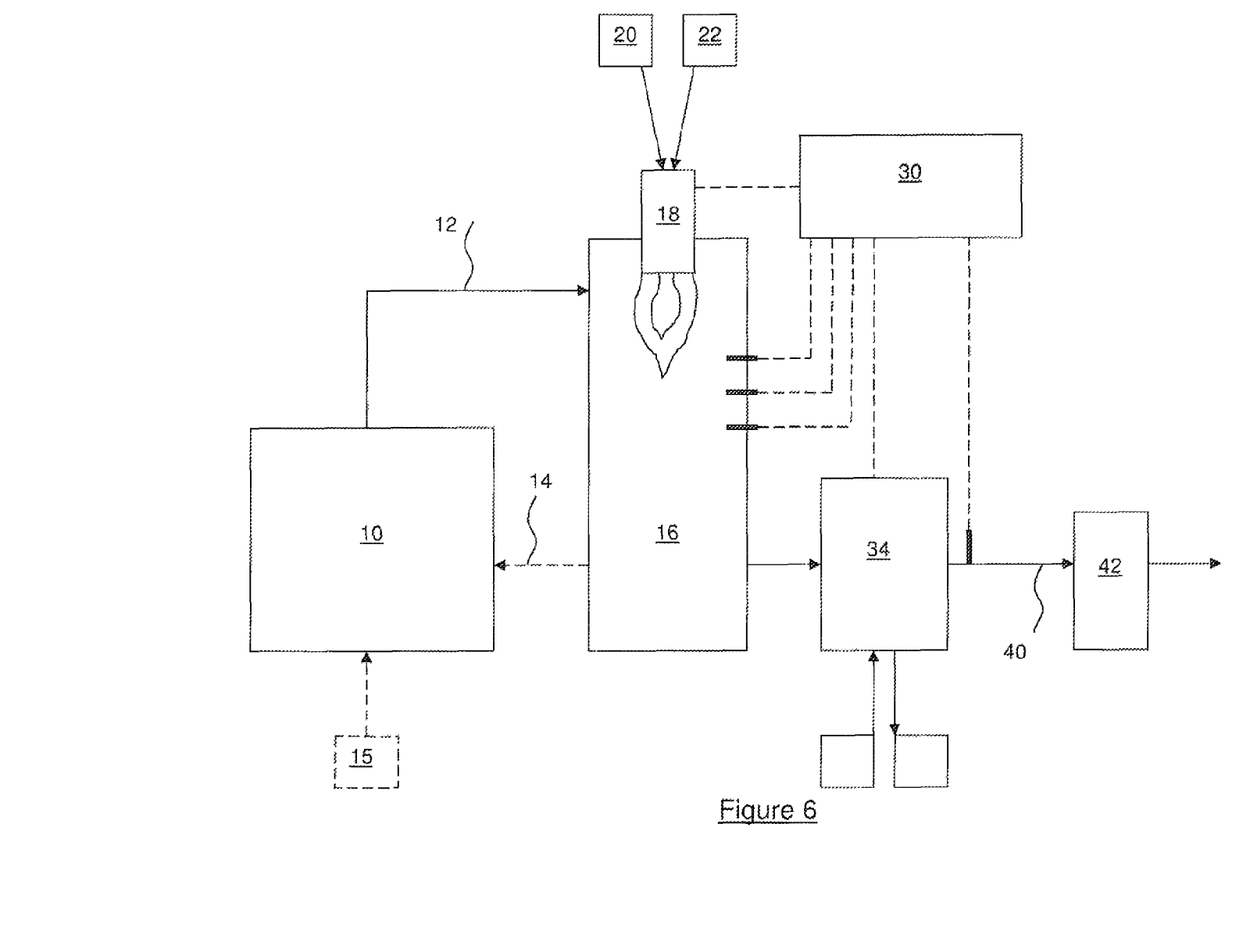
FIG. 6 shows a schematic flow chart of a gasification method of the invention.

In a further embodiment of the invention as shown in FIG. 6 a variation of the above described system is shown. In this embodiment, instead of the burner 18 of the thermal treatment chamber being provided with enough oxygen 22 to just combust the fuel 20, sufficient oxygen is provided to also combust the syngas produced in the processing chamber 10.

As with the systems described above the processing chamber 10 may be heated by recirculating the hot gas from the treatment chamber 16 via conduits 12, 14, or alternatively a separate source of heat 15 can be provided and the conduit 14 omitted. The hot gas exiting the thermal treatment chamber 16 passes into the boiler 34 where it exchanges heat to produce steam that can be used to drive a steam turbine to produce electricity, for example. The cooled gas exiting the boiler 34 then passes to a scrubber 42 via conduit 40 to clean it before discharging it, although depending on the completeness of the process in the thermal treatment chamber 16 this final stage scrubbing may not be necessary. The controller 30 controls the system in the different modes of operation as described above to clean the system of soot. In particular, in a recirculating system by supplying oxygen in excess of that needed to fully combust the syngas in the thermal treatment chamber the oxygen in the system can be increased to remove the soot.

Alternatively the oxygen may be introduced independently from the burner 18 as will be necessary if the conduit 14 is omitted and the treatment chamber 10 is heated by an independent heat source 15. The oxygen for the second stage of operation may in this case be added in the heat source 15, between the heat source and the processing chamber 10, or directly into the processing chamber 10. Where recirculating gases are used, as opposed to adding the extra oxygen in the burner 10 it may be added at any point in the recirculating gas path.

It will be understood that the majority of the description of the operation of the system described in relation to FIGS. 1 to 5 applies mutatis mutandis to the system of FIG. 6.

The invention claimed is:

1. A batch processing method of pyrolysing and/or gasifying organically coated waste and organic materials, the method comprising:

in a first mode of operation heating the material in a processing chamber, by recirculating hot gas therethrough, to pyrolyse and/or gasify it to produce syngas and soot and a residual material; and in a second mode of operation increasing the oxygen content of the recirculating hot gas such that the oxygen reacts with the soot to form carbon monoxide; and in the second mode of operation:

monitoring one or more of the calorific value of the gas, the hydrogen content of the gas, the carbon monoxide content, and the temperature of the gas; and if one or more of the calorific value, the hydrogen content, and the carbon monoxide content of the gas is below a predetermined threshold, and/or if the temperature of the gas remains substantially constant; ending the process.

2. The batch processing method as claimed in claim 1 wherein the second mode of operation is carried out in the same processing chamber as the first mode of operation.

3. The batch processing method as claimed in claim 1 comprising maintaining the residual material in the processing chamber during the second mode of operation.

4. The batch processing method according to claim 1 wherein in the second mode of operation steam is introduced into the recirculating hot gas.

5. The batch processing method according to claim 1 comprising, in the second mode of operation detecting a rise in the one or more of the calorific value of the gas, the hydrogen content of the gas, and the carbon monoxide content of the gas, and performing a third mode of operation in which further oxygen is introduced into recirculating gas; wherein, in the third mode of operation one or more of the calorific value of the gas, the hydrogen content of the gas, and the carbon monoxide content of the recirculating gas continue to be monitored.

6. The batch processing method according to 5 wherein in the third mode of operation the temperature of the recirculating gas is monitored.

7. The batch processing method according to claim 5 wherein in the third mode of operation steam is introduced into the recirculating hot gas.

8. The batch processing method according to claim 5 wherein the process is a pyrolysis process and said hot gas contains substantially no oxygen in the first mode of operation and the hot gas contains 1-21% by volume oxygen in the second and/or third mode of operation.

9. The batch processing method according to claim 5 wherein the process is a gasification process and said hot gas contains 3-12% by volume oxygen in the first mode of operation and the hot gas contains 6-21% by volume oxygen in the second and/or third mode of operation.

10. The batch processing method according to claim 1 wherein the second mode of operation follows the first mode of operation after the majority of the material has been pyrolysed/gasified.

11. The batch processing method according to claim 1 wherein the temperature of the recirculating gas is increased during the second mode of operation.

12. The batch processing method according to claim 11 further comprising passing the gas through a boiler down stream of the treatment chamber;

in the first mode of operation operating the boiler at a first level to extract heat therefrom; and in the second mode of operation operating the boiler at a second level to extract heat therefrom, the second level being lower than the first level to thereby remove less heat.

13. The batch processing method according to claim 12 wherein, in the second mode of operation a flow of water to the boiler is reduced such that the gas exiting therefrom is in excess of 350° C.

14. The batch processing method according to claim 12 further comprising:

in the first mode of operation passing the gas exiting the boiler through a first scrubber; and in the second mode of operation passing the gas exiting the boiler through a second scrubber.

15. The batch processing method according to claim 1 further comprising: in the second mode of operation, flaring the gas exiting the second scrubber to atmosphere.

16. The batch processing method according to claim 1, wherein the method further comprises:

passing the syngas through a thermal treatment chamber in which it is heated for a dwell time to destroy any VOC's therein and wherein:

heating the material comprises burning fuel and oxygen at a stoichiometric ratio in a burner in the treatment chamber and circulating the hot gasses through the processing chamber; and wherein increasing the oxygen concentration comprises adding additional oxygen containing gas to the hot gas to passing through the processing chamber to increase the oxygen concentration thereof.

17. The batch processing method according to claim 5 wherein, during the third mode of operation, one or more of the velocity of the recirculating gas, the temperature of the recirculating gas and the oxygen content of the recirculating gas is fluctuated.

18. The batch processing method according to claim 1, wherein the method is performed using a batch pyrolysis system comprising:

the processing chamber in which the material is heated;

conduits for recirculating the hot gas through the processing chamber to heat the material therein to pyrolyse it to produce the syngas and the soot;

a thermal treatment chamber in which the pyrolysis gasses are heated for a dwell time to destroy any VOC's therein;

a controller configured to operate the system in the first mode of operation to provide the hot gas containing substantially no oxygen to the processing chamber so that the hot gas pyrolyses the material to produce the syngas, the soot, and the residual material, and to operate the system in the second mode of operation to provide the hot gas containing substantially no oxygen to the processing chamber wherein the oxygen content of the gas is greater in the second mode of operation than in the first mode of operation; and one or both of:

a sensor configured to perform the monitoring of one or more of the calorific value of the gas, the hydrogen content of the gas, and the carbon monoxide content of the gas, and creating signals indicative thereof, said controller being configured to monitor said signals created by the sensor and to end the process if one or more of the calorific value, the hydrogen content, and the carbon monoxide content of the gas is below a predetermined threshold; and/or a temperature sensor configured to sense the temperature of gas recirculating within the system and create a signal indicative thereof, said controller configured to monitor the signal indicative of the gas temperature and if the temperature of the gas recirculating within the system remains substantially constant, end the process.

19. The method according to claim 18 wherein the controller is configured to switch from the first mode of operation to the second mode of operation without removing any of said residual material.

20. The method according to claim 18 wherein the system further comprises a steam input for introducing steam into the system, and wherein the controller is configured to operate the steam input to introduce the steam into the system in the second mode of operation.

21. The method according to claim 18 wherein, and if a rise is detected in the calorific value of the gas, the controller is further configured to operate the system in a third mode of operation in which further oxygen is introduced into the recirculating gas, and in the third mode of operation continue to monitor the signals indicative of the one or more of the calorific value of the gas, the hydrogen content of the gas, and the carbon monoxide content of the gas.

22. The method according to claim 18 further comprising:
a conduit leading from the thermal treatment chamber to a boiler; and wherein
the controller is further configured to control the amount of heat extracted from the boiler in the second mode of operation to maintain the temperature of the gas downstream of the boiler in excess of 350° C.

23. The method of claim 22 further comprising: two scrubbers downstream of the boiler and a valve, and wherein the controller is configured to operate the valve to direct the gas to a first one of said scrubbers in the first mode of operation and to direct the gas to a second one of said scrubbers in the second mode of operation.

24. The method of claim 22 further comprising:
a flare stack downstream of the boiler for the combustion of gas passing therethrough and a diverter valve, wherein the controller is configured to divert the syngas flow to the flare stack in the second mode of operation.

25. The method of claim 24 further comprising a syngas engine and wherein the controller is configured to operate the diverter valve to divert the gas flow to the syngas engine in the first mode of operation.

26. The batch processing method according to claim 5 wherein the temperature of the recirculating gas is increased during the third, or second and third, mode of operation.

27. The batch processing method according to claim 26 further comprising passing the gas through a boiler down stream of the treatment chamber;
in the first mode of operation operating the boiler at a first level to extract heat therefrom; and
in the third, or second and third, mode of operation operating the boiler at a second level to extract heat therefrom, the second level being lower than the first level to thereby remove less heat.

28. The batch processing method according to claim 27 wherein, in the third, or second and third, mode of operation a flow of water to the boiler is reduced such that the gas exiting therefrom is in excess of 350° C.

29. The batch processing method according to claim 27 further comprising:
in the first mode operation passing the gas exiting the boiler through a fist scrubber; and
in the third, or second and third, mode of operation passing the gas exiting the boiler through a second scrubber.

30. The batch processing method according to claim 5 further comprising: in the third, or second and third, mode of operation, flaring the gas exiting the second scrubber to atmosphere.

* * * * *